(12) United States Patent
Ieda et al.

(10) Patent No.: US 8,242,898 B2
(45) Date of Patent: Aug. 14, 2012

(54) TURN SIGNAL ILLUMINATION CONTROLLER

(75) Inventors: Takashi Ieda, Aichi (JP); Takao Imai, Aichi (JP); Kozo Nishimura, Aichi (JP); Syogo Yamaguchi, Aichi (JP); Takahiro Shimizu, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 320 days.

(21) Appl. No.: 12/789,288

(22) Filed: May 27, 2010

(65) Prior Publication Data

US 2010/0308988 A1    Dec. 9, 2010

(30) Foreign Application Priority Data

Jun. 3, 2009   (JP) ................................ 2009-134048

(51) Int. Cl.
*B60Q 1/40* (2006.01)

(52) U.S. Cl. ........ 340/477; 340/438; 340/475; 340/476; 340/463; 340/465; 340/468

(58) Field of Classification Search .................. 340/477, 340/475, 476, 438, 463, 465, 468
See application file for complete search history.

(56) References Cited

U.S. PATENT DOCUMENTS

| 5,712,618 | A | 1/1998 | McKenna |
| 6,483,430 | B2 * | 11/2002 | Okuda et al. .................. 340/476 |
| 6,819,235 | B2 * | 11/2004 | Hasebe ........................ 340/476 |
| 2008/0204212 | A1 | 8/2008 | Jordan et al. |

FOREIGN PATENT DOCUMENTS

JP      11-070833      3/1999

* cited by examiner

*Primary Examiner* — Tai T Nguyen
(74) *Attorney, Agent, or Firm* — James R. Gourley; Colin P. Cahoon; Carstens & Cahoon, LLP

(57) ABSTRACT

A turn signal illumination controller monitors the lateral movement distance of a vehicle from when a turn switch lever is operated so as to illuminate a turn signal indicator. When the lateral movement distance is greater than or equal to a threshold value indicating completion of lane changing, the turn signal illumination controller cancels the turn signal indicator.

9 Claims, 9 Drawing Sheets

TURN SIGNAL ILLUMINATION CONTROLLER

CROSS-REFERENCE TO RELATED APPLICATIONS

This application is based upon and claims the benefit of priority from prior Japanese Patent Application No. 2009-134048, filed on Jun. 3, 2009, the entire contents of which are incorporated herein by reference.

BACKGROUND OF THE INVENTION

The present invention relates to illumination control of a turn signal for a vehicle, and more particularly, to a turn signal illumination controller that automatically cancels an illuminated turn signal indicator.

Turn signal indicators are arranged on an outer surface of a vehicle to notify others that the vehicle will turn right or left at an intersection or change lanes. A turn switch lever, which is arranged near the steering wheel, is tilted to the right (clockwise direction) to flash a right turn signal indicator, and tilted to the left (counterclockwise direction) to flash a left turn signal indicator.

The vehicle includes a turn signal illumination controller that controls the illumination and cancellation of the turn signal indicators in accordance with the operation of the turn switch lever. A widely used mechanical turn signal illumination controller switches a turn signal indicator from an illuminated state to a cancelled state by mechanically activating and deactivating a switch contact in cooperation with the movement of the turn switch lever. The operation of the mechanical turn signal illumination controller when the vehicle is turned to the right will now be described. The driver, for example, tilts the turn switch lever to the right from a neutral position and rotates the steering wheel to the right (clockwise rotation). When tilted to the right, the turn switch lever activates a micro switch. Further, a holding mechanism holds the turn switch lever at a right tilt position and keeps the micro switch activated. As long as the micro switch remains activated, the turn signal indicator continues to flash. Then, when the steering wheel is rotated back to the left (back rotation), the holding mechanism releases the turn switch lever in cooperation with the back rotation. This returns the turn switch lever to the neutral position from the right tilt position thereby deactivating the micro switch and cancelling the turn signal indicator.

Japanese Laid-Open Patent Publication No. 11-70833 discusses an auto-cancellation type turn signal illumination controller that automatically cancels a turn signal indicator without cooperating with the turn signal switch lever. The auto-cancellation type turn signal illumination controller includes a rotational angle sensor, which monitors the rotational angle of the steering wheel. When the steering wheel is rotated back toward its original position while the turn signal indicator is flashing, the turn signal illumination controller automatically cancels the turn signal indicator when the rotational angle sensor detects that the angle of the back rotation has reached a cancellation angle.

SUMMARY OF THE INVENTION

Referring to the upper part of FIG. 17, when the driver flashes the turn signal indicator and starts to change lanes, the driver may, for example, hesitate to further proceed with the lane changing or temporarily drive straight near the lane markings (time t10). As a result, the steering wheel may be rotated such that the back rotation angle exceeds the cancellation angle. This would cancel the turn signal indicator before the driver almost completes changing lanes (time t11). Such cancellation is not intentional. Thus, the driver may have to operate the turn switch lever again to flash the turn signal indicator.

The present invention provides a turn signal illumination controller that improves the function for automatically cancelling a turn signal indicator.

One aspect of the present invention is a turn signal illumination controller that illuminates a turn signal indicator when a turn signal operation member, which is arranged in a vehicle, is operated. The turn signal illumination controller includes an angular velocity detection unit that detects angular velocity of the vehicle when the vehicle changes its travel direction. A vehicle bearing angle variation calculation unit calculates a vehicle bearing angle variation amount per unit time when the travel direction is changing based on a detection value of the angular velocity detection unit. A vehicle bearing angle calculation unit calculates a vehicle bearing angle when the travel direction is changing based on the vehicle bearing angle variation amount obtained by the vehicle bearing angle variation calculation unit. A lateral movement distance calculation unit calculates a lateral movement distance of the vehicle when the travel direction is changing based on the vehicle bearing angle obtained by the vehicle bearing angle calculation unit. A cancellation execution unit cancels the illuminated turn signal indicator when the calculated lateral movement distance is greater than or equal to a threshold value.

In this structure, the automatic cancellation conditions of the turn signal indicator include the calculated lateral movement direction of the vehicle being greater than or equal to the threshold value. Thus, even when the driver hesitates to further proceed with lane changing or temporarily drives straight near the lane markings and rotates the steering wheel in a direction opposite to the lane changing direction, unintentional cancellation of the turn signal indicator before the lane changing is completed does not occur. This improves the automatic cancellation accuracy of the turn signal indicator.

In an embodiment, the turn signal illumination controller further includes a stabilization determination unit that determines whether the calculated lateral movement distance is stable. When the cancellation execution unit determines that a condition in which the calculated lateral movement distance is greater than or equal to the threshold value and a condition in which the calculated lateral movement distance is stable are at least both satisfied, the cancellation execution unit cancels the illuminated turn signal indicator.

In this structure, the automatic cancellation conditions of the turn signal indicator include the calculated lateral movement distance of the vehicle being stable. This allows for lane changing completion of the vehicle to be determined with further accuracy. Thus, the automatic cancellation accuracy of the turn signal indicator is further improved.

In an embodiment, the turn signal illumination controller further includes a rotational amount detection unit that detects a rotational angle of a steering wheel of the vehicle. A returning angle monitoring unit monitors a returning angle of the steering wheel in a direction opposite to the rotation direction of the steering wheel when the turn signal operating member is operated to illuminate the turn signal indicator based on the rotational angle of the steering wheel detected by the rotational amount detection unit and determines whether or not the returning angle is greater than or equal to a recovery determination reference value. When the cancellation execution unit determines that a condition in which the calculated lateral movement distance is greater than or equal to the threshold value and a condition in which the returning angle is greater than or equal to the recovery determination reference value are at least both satisfied, the cancellation execution unit cancels the illuminated turn signal indicator.

In this structure, the automatic cancellation conditions of the turn signal indicator include the returning angle being greater than or equal to the recovery determination reference value. This allows for lane changing completion of the vehicle to be determined with further accuracy. Thus, in comparison to when determining cancellation just with the calculated lateral movement distance, the automatic cancellation accuracy of the turn signal indicator is further improved.

In an embodiment, the turn signal illumination controller further includes a rotational amount detection unit that detects the rotational angle of a steering wheel of the vehicle. A peak detection unit monitors the rotational angle of the steering wheel detected by the rotational amount detection unit and detects a peak in the rotational angle during rotation of the steering wheel in the direction opposite to the rotational direction of the steering wheel when the turn signal operating member is operated to illuminate the turn signal indicator. When the cancellation execution unit determines that a condition in which the calculated lateral movement distance is greater than or equal to the threshold value and a condition in which the peak is detected are at least both satisfied, the cancellation execution unit cancels the illuminated turn signal indicator.

In this structure, the automatic cancellation conditions of the turn signal indicator include detection of a peak in rotation of the steering wheel in the direction opposite to the rotational direction of the steering wheel when the turn signal indicator is illuminated. This allows for lane changing completion of the vehicle to be determined with further accuracy. Thus, in comparison to when determining cancellation just with the calculated lateral movement distance, the automatic cancellation accuracy of the turn signal indicator is further improved.

In an embodiment, the turn signal illumination controller further includes an output correction unit that corrects a detection value of the angular velocity detection unit by subtracting from the detection value of the angular velocity detection unit an initial angular velocity of the vehicle detected when the turning signal operating member is operated to illuminate the turn signal indicator. The initial angular velocity is produced by rotation of the steering wheel before the turn signal indicator is illuminated.

In this structure, when changing lanes while driving along a curved road, the initial angular velocity produced when driving along such a curved road is eliminated from the sensor output of the angular velocity. This allows for the lateral movement distance to be calculated in accordance with the angular velocity produced when changing lanes. Thus, the lateral movement distance is calculated with further accuracy, and the automatic cancellation accuracy of the turn signal indicator is further improved.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

First Embodiment

A turn signal illumination controller according to a first embodiment of the present invention will now be discussed with reference to FIGS. 1 to 7.

Figure 1:
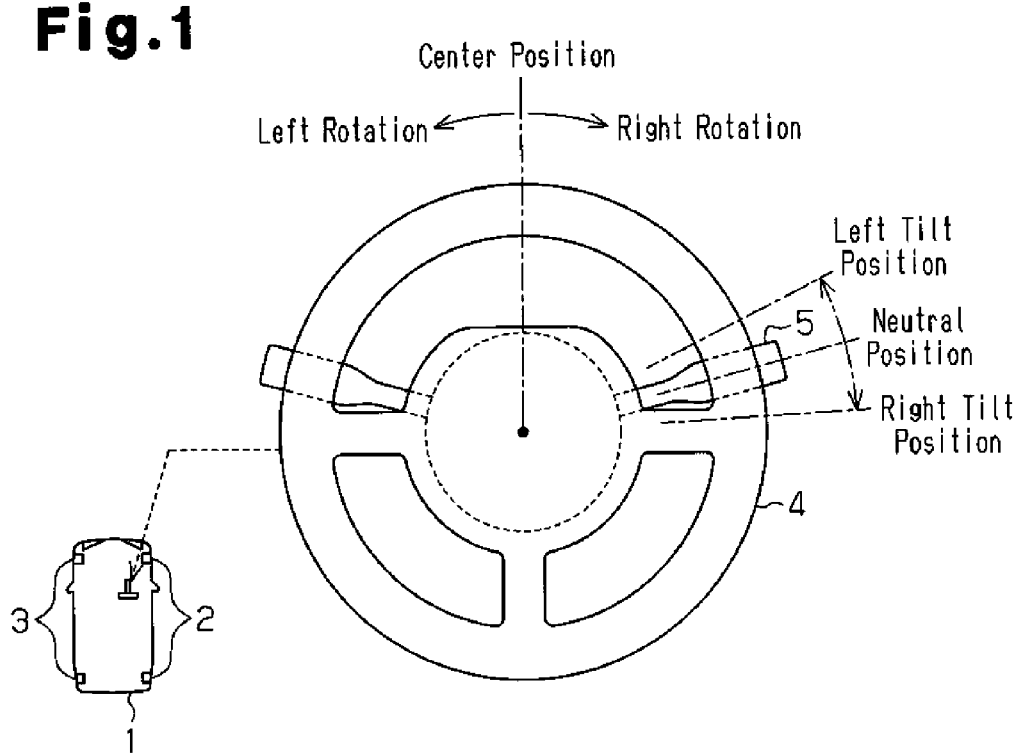
FIG. 1 is a schematic diagram showing a turn switch lever and a steering wheel.

As shown in FIG. 1, a vehicle 1 includes turn signal indicators 2 and 3, which notify others of the direction in which the vehicle 1 will proceed, such as when turning right or left and when changing lanes. Normally, the turn signal indicator 2 is arranged on the right front and rear parts of the vehicle body, and the turn signal indicator 3 is arranged on the left front and rear parts of the vehicle body.

A steering wheel 4 is arranged in the passenger compartment. A turn switch lever 5 is arranged near the steering wheel 4 and operated when illuminating the turn signal indicators 2 and 3. In the illustrated example, the turn switch lever 5 is tiltable about its basal end to the right (clockwise direction) and to the left (counterclockwise direction). For example, the right turn signal indicator 2 flashes when the turn switch lever 5 is tilted to the right from the neutral position, and the left turn signal indicator 2 flashes when the turn switch lever 5 is tilted to the left from the neutral position. In the illustrated example, the turn switch lever 5 is of a momentary type. Thus, when the driver releases the turn switch lever 5 after tilting it, the turn switch lever 5 automatically returns to the neutral position. The turn switch lever 5 serves as an operation member.

Figure 2:
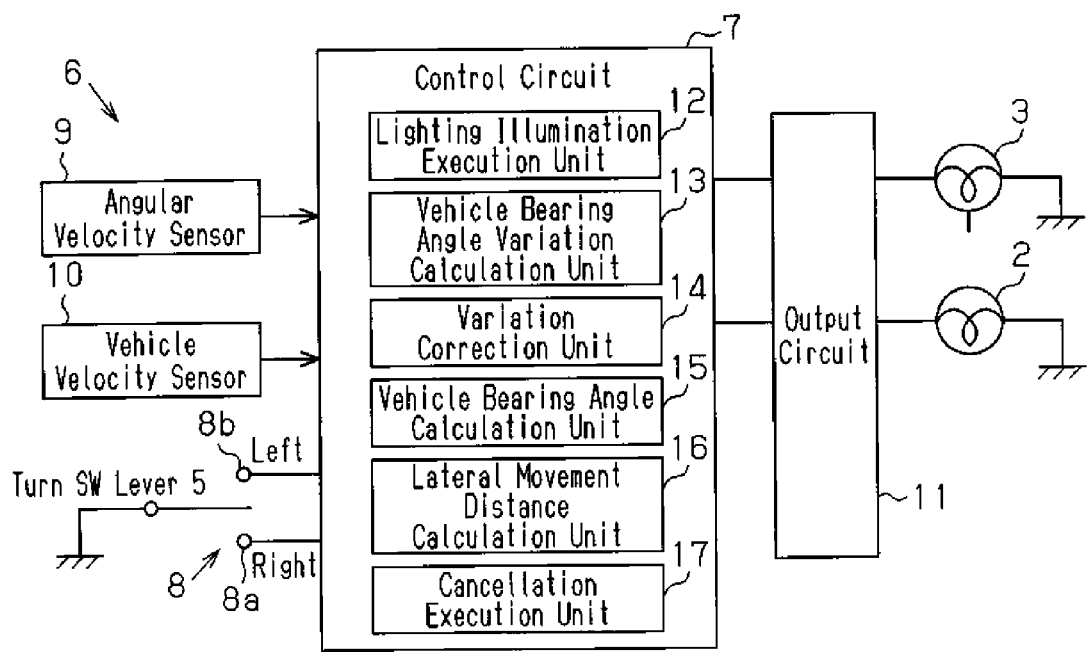
FIG. 2 is a block diagram of a turn signal illumination controller according to a first embodiment.

Referring to FIG. 2, the vehicle 1 includes a turn signal illumination controller 6, which controls the illumination and the cancellation of the turn signal indicators 2 and 3. The turn signal illumination controller 6 includes a control circuit 7, which serves as a control unit. The control circuit 7 includes electronic components, such as a central processing unit (CPU) and a memory, and controls the illumination and cancellation of the turn signal indicators 2 and 3.

A turn switch 8, which detects the operation position of the turn switch lever 5, is connected to the control circuit 7. The turn switch 8 detects whether the turn switch lever 5 is located at the neutral position, right tilt position, or left tilt position.

In the illustrated example, the turn switch 8 is a form C contact switch. The turn switch 8 is deactivated when the turn switch lever 5 is located at the neutral position. The turn switch 8 has a right switch contact 8a, which goes on when the turn switch lever 5 is tilted to the right, and a left switch contact 8b, which goes on when the turn switch lever 5 is tilted to the left.

An angular velocity sensor 9, which detects the angular velocity $\omega(t)$ of the vehicle 1, is connected to the control circuit 7. The angular velocity $\omega(t)$ is generated when, for example, the vehicle 1 changes directions such as when changing lanes. The angular velocity sensor 9 is, for example, a yaw rate sensor and sequentially sends an angular velocity detection signal, which is in accordance with the angular velocity $\omega(t)$ of the vehicle 1, to the control circuit 7. The control circuit 7 calculates the angular velocity $\omega(t)$ based on the angular velocity detection signal received from the angular velocity sensor 9.

A vehicle velocity sensor 10, which detects the travel velocity of the vehicle (vehicle velocity V(t)), is connected to the control circuit 7. The vehicle velocity sensor 10 includes a rotary encoder, which detects the rotation of a wheel per unit time, and sequentially sends a vehicle velocity detection signal, which is in accordance with the vehicle velocity V(t), to the control circuit 7. The control circuit 7 calculates the vehicle velocity V(t) based on the vehicle velocity detection signal received from the vehicle velocity sensor 10.

The control circuit 7 is connected to the turn signal indicators 2 and 3 by an output circuit 11, which functions as a turn signal indicator driver. The control circuit 7 controls the illumination and cancellation of the turn signal indicators 2 and 3 based on various signals, such as the angular velocity detection signal from the angular velocity sensor 9 and the vehicle velocity detection signal from the vehicle velocity sensor 10.

The control circuit 7 includes an illumination execution unit 12, which executes the illumination of the turn signal indicators 2 and 3. The illumination execution unit 12 switches the turn signal indicators 2 and 3 from a cancelled state to an illuminated state based on a switch signal from the turn switch 8. For example, the illumination execution unit 12 flashes the right turn signal indicator 2 when receiving a right tilt switch signal from the turn switch 8. The illumination execution unit 12 flashes the left turn signal indicator 3 when receiving a left tilt switch signal from the turn switch 8.

Figure 3:
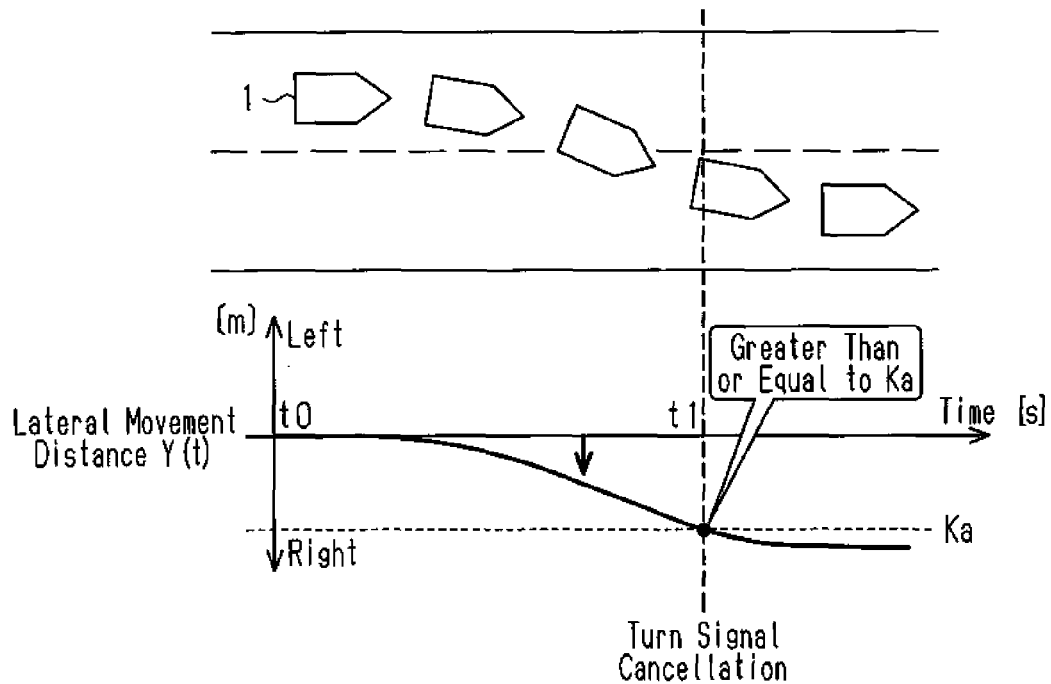
FIG. 3 is a timing chart showing changes in a lateral movement distance when a vehicle changes lanes.
Figure 4:
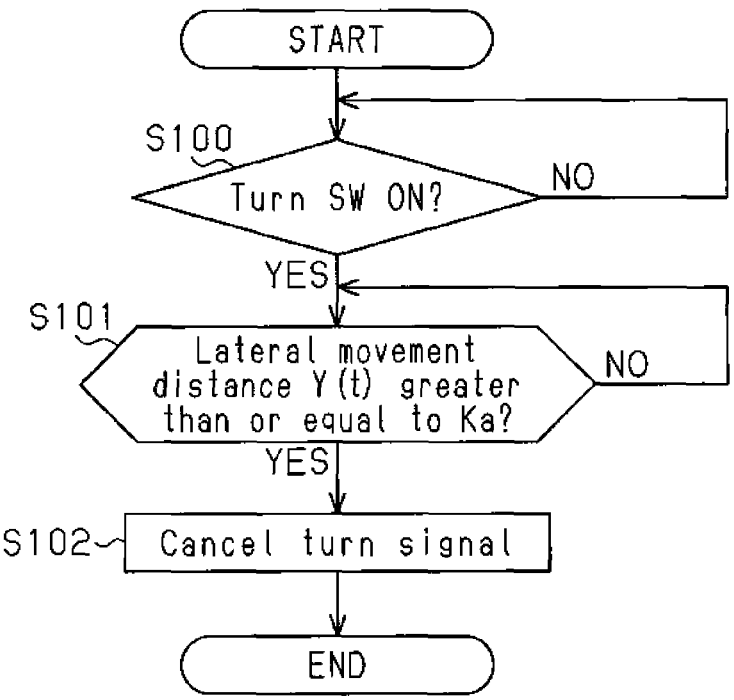
FIG. 4 is a flowchart of a turn signal indicator cancellation control according to the first embodiment.

The control circuit 7 includes various cancellation functions for automatically cancelling the flashing of the turn signal indicators 2 and 3 regardless of the position of the turn switch lever 5. Referring to FIGS. 3 and 4, the cancellation function of the first embodiment calculates a lateral movement distance Y(t) of the vehicle 1 from time t0, which is when the turn signal indicators 2 and 3 are activated. When determining at time t1 that the lateral movement distance Y(t) has become greater than or equal to a threshold value Ka, which is a reference value for determining that the vehicle 1 has completed changing lanes, the control circuit 7 automatically cancels the turn signal indicators 2 and 3. The lateral movement distance Y(t) is the distance the vehicle 1 moves in a lateral direction, which is orthogonal to the direction the vehicle 1 was traveling (also referred to as the predicted course) just before illumination the turn signal indicators 2 and 3. The threshold value Ka is set as the movement distance required for the vehicle 1 to move to the next lane when changing lanes. Normally, the threshold value Ka is stored in the control circuit 7. The threshold value Ka may also be referred to as a first cancellation determination reference value.

Figure 5:
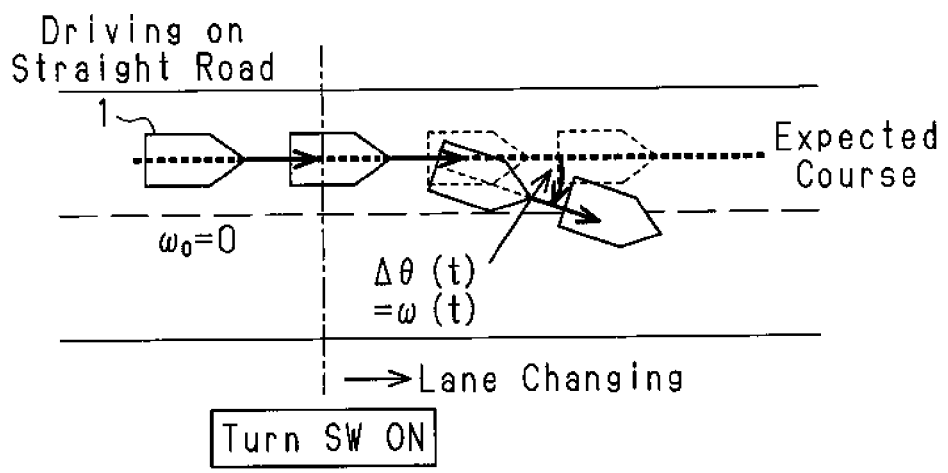
FIG. 5 is a diagram illustrating a vehicle bearing angle variation amount.

The automatic cancellation function of the first embodiment will now be described in detail. The control circuit 7 includes a vehicle bearing angle variation calculation unit 13, which calculates the bearing angle variation amount $\Delta\theta(t)$ of the vehicle 1 based on the angular velocity detection signal from the angular velocity sensor 9. Referring to FIG. 5, the vehicle bearing angle variation amount $\Delta\theta(t)$ corresponds to travel direction variation velocity, that is, the variation amount of the travel direction of the vehicle 1 per unit time when changing lanes. More specifically, when the travel direction of the vehicle 1 just before calculation of the vehicle bearing angle is the expected course, the variation in the travel direction of the vehicle 1 from the expected course per unit time during lane changing is the vehicle bearing angle variation amount $\Delta\theta(t)$. The vehicle bearing angle variation calculation unit 13 serves as a vehicle bearing angle variation calculation means.

Figure 6:
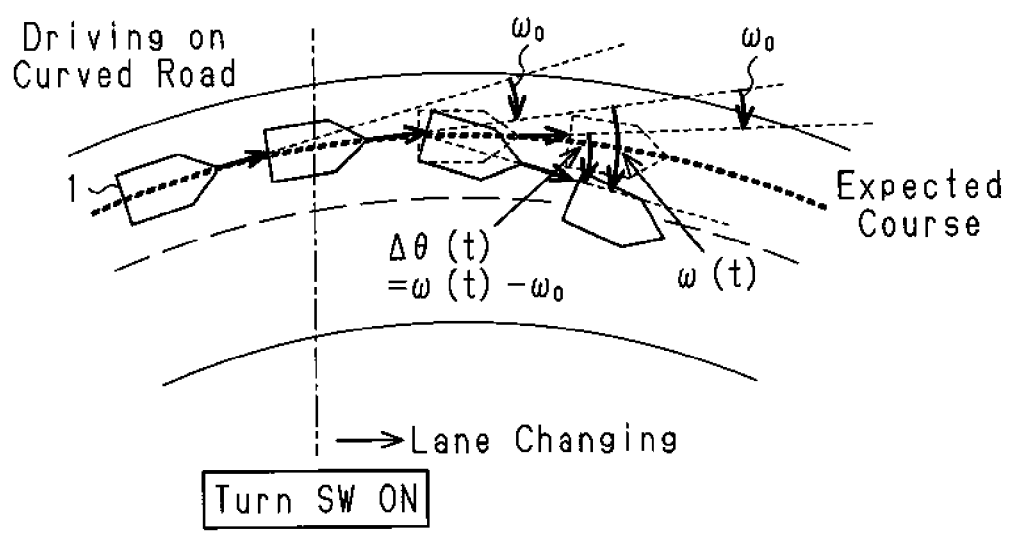
FIG. 6 is a diagram illustrating the correction of the vehicle bearing angle.

The control circuit 7 further includes a variation correction unit 14. As shown in FIG. 6, the vehicle 1 may change lanes when traveling along a curved road. In this case, when the vehicle 1 starts to change lanes, the vehicle 1 has already been producing an angular velocity that is in accordance with the curvature of the curved road (initial vehicle bearing angle variation amount $\omega 0$). Thus, to accurately obtain the lateral movement distance Y(t) when changing lanes while traveling along a curved road, the initial vehicle bearing angle variation amount $\omega 0$ must be taken into consideration. Hence, in one example, the variation correction unit 14 subtracts the initial vehicle bearing angle variation amount $\omega 0$ from the vehicle bearing angle variation amount $\Delta\theta(t)$, which is calculated by the vehicle bearing angle variation calculation unit 13, to calculate a corrected vehicle bearing angle variation amount $\Delta\theta(t)$. In another example, the variation correction unit 14 subtracts the initial vehicle bearing angle variation amount $\omega 0$ from the angular velocity $\omega(t)$, which is detected by the angular velocity sensor 9, and sends the difference to the vehicle bearing angle variation calculation unit 13. In a further example, the variation correction unit 14 is incorporated in the vehicle bearing angle variation calculation unit 13. In this manner, the variation correction unit 14 and the vehicle bearing angle variation calculation unit 13 processes and calculates the vehicle bearing angle variation amount $\Delta\theta(t)$ taking into consideration the initial vehicle bearing angle variation amount $\omega 0$. The variation correction unit 14 serves as an output correction unit or output correction means, and the initial vehicle bearing angle variation amount $\omega 0$ serves as an initial angular velocity.

Figure 7:
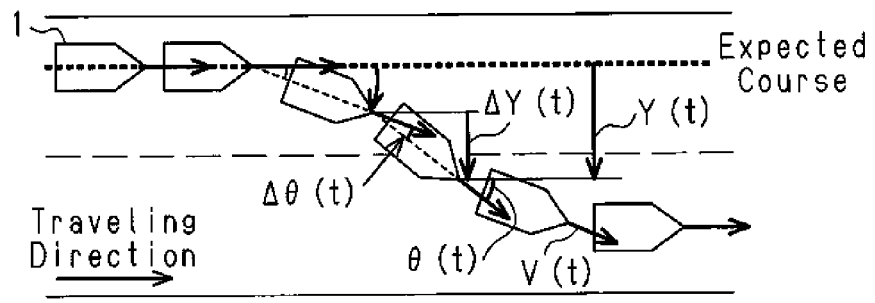
FIG. 7 is a diagram illustrating the vehicle bearing angle and the lateral movement distance.

The control circuit 7 includes a vehicle bearing angle calculation unit 15, which calculates a vehicle bearing angle $\theta(t)$ that is in accordance with the travel direction of the vehicle 1 when changing lanes based on the vehicle bearing angle variation amount $\Delta\theta(t)$ obtained by the vehicle bearing angle variation calculation unit 13 and the variation correction unit 14. Referring to FIG. 7, the vehicle bearing angle $\theta(t)$ corresponds to the travel direction of the vehicle 1 relative to the expected course after a predetermined time elapses from when the vehicle 1 changes its travel direction to change lanes. The vehicle bearing angle calculation unit 15 serves as a vehicle bearing angle calculation means.

The control circuit 7 includes a lateral movement distance calculation unit 16, which calculates movement distance Y(t) of the vehicle 1 in the lateral direction when changing lanes. Referring to FIG. 7, the lateral movement distance calculation unit 16 uses the vehicle velocity V(t), which is obtained by the vehicle velocity sensor 10, and the vehicle bearing angle θ(t), which is obtained by the vehicle bearing angle calculation unit 15, to calculate the lateral movement distance Y(t) with, for example, a trigonometric function. The lateral movement distance calculation unit 16 serves as a lateral movement distance calculation means.

The control circuit 7 includes a cancellation execution unit 17, which cancels the turn signal indicators 2 and 3. The cancellation execution unit 17 compares the lateral movement distance Y(t), which is calculated by the lateral movement distance calculation unit 16, with the threshold value Ka. When the lateral movement distance Y(t) is greater than or equal to the threshold value Ka, the cancellation execution unit 17 determines that the turn signal indicators 2 and 3, which are illuminated when changing lanes, should be cancelled and thereby cancels the illuminated turn signal indicators 2 and 3. The cancellation execution unit 17 serves as a cancellation execution means.

The operation of the turn signal illumination controller 6 will now be discussed with reference to FIGS. 3 and 4.

Referring to FIG. 3, for example, when the vehicle 1 enters a lane to the right, the driver tilts the turn switch lever 5 to the right. As a result, the right switch contact 8a of the turn switch 8 goes on (step 100 in FIG. 4). When the right switch contact 8a goes on, the illumination execution unit 12 flashes the right turn signal indicator 2. Further, various cancellation functions of the control circuit start to monitor the fulfillment of cancellation conditions to cancel the right turn signal indicator 2 upon completion of the lane changing.

The vehicle bearing angle variation calculation unit 13 calculates the angular velocity ω(t) from the angular velocity signal of the angular velocity sensor 9. Then, the vehicle bearing angle variation calculation unit 13 outputs the angular velocity ω(t) as the vehicle bearing angle variation amount Δθ(t). The variation correction unit 14 corrects the vehicle bearing angle variation amount Δθ(t) based on equation (A), which is shown below, and then outputs the corrected value.

$$\Delta\theta(t)=\omega(t)-\omega 0 \quad\quad (A)$$

The initial vehicle bearing angle variation amount ω0 corresponds to the angular velocity of the vehicle 1 just before changing lanes. In the first embodiment, the initial vehicle bearing angle variation amount ω0, which is obtained when the vehicle 1 travels along a curved road, is eliminated from the sensor output of the angular velocity sensor 9 (angular velocity detection signal). This allows for the calculation of an angular velocity resulting from only the lane changing. When the fulfillment of the cancellation conditions is being monitored, the initial vehicle bearing angle variation amount ω0 is obtained under the assumption that the curvature of the road is constant for the sake of convenience. The vehicle bearing angle variation calculation unit 13 repeats the calculation of the vehicle bearing angle variation amount Δθ(t) until the right turn signal indicator 2 is canceled.

After the calculation of the vehicle bearing angle variation amount Δθ(t), the vehicle bearing angle calculation unit 15 calculates the vehicle bearing angle θ(t) based on equation (B), which is shown below.

$$\theta(t)=\int(\omega(t)-\omega 0)dt \quad\quad (B)$$

More specifically, the vehicle bearing angle calculation unit 15 integrates the vehicle bearing angle variation amount Δθ(t), which is obtained from equation (A), to calculate the vehicle bearing angle θ(t). The vehicle bearing angle variation amount Δθ(t) that is repetitively calculated per unit time is sequentially added to calculate the vehicle bearing angle θ(t), which corresponds to the varied angle of the travel direction of the vehicle 1 from when the vehicle 1 starts changing lanes to when the calculation is performed (i.e., the present point of time).

After the calculation of the vehicle bearing angle θ(t), the lateral movement distance calculation unit 16 calculates the lateral movement distance Y(t) based on equation (c), which is shown below.

$$Y(t)=\int V(t)\cdot\sin\theta(t)dt \quad\quad (C)$$

More specifically, the lateral movement distance calculation unit 16 uses the vehicle velocity V(t) and the vehicle bearing angle θ(t) to obtain the variation amount in the lateral movement direction from the relationship of the trigonometric function and integrates the variation amount. This obtains the lateral movement distance Y(t) of the vehicle 1 from when the vehicle 1 starts changing lanes to when the calculation is performed (i.e., the present point of time). The calculation of the lateral movement distance Y(t), which is achieved by processing equations (A) to (C), is repetitively performed when the right turn signal indicator 2 is illuminated.

Then, the cancellation execution unit 17 compares the lateral movement distance Y(t), which is obtained from equation (C), with the threshold value Ka and determines whether the lateral movement distance Y(t) is greater than or equal to the threshold value Ka (step 101 in FIG. 4). When the lateral movement distance Y(t) is less than the threshold value Ka, the illumination of the right turn signal indicator 2 continues. When the lateral movement distance Y(t) is greater than or equal to the threshold value Ka, the cancellation execution unit 17 determines that the vehicle 1 has moved in the lateral direction for a distance that is sufficient for completing lane changing. Thus, the cancellation execution unit 17 cancels the illuminated right turn signal indicator 2 (step 102 in FIG. 4). The cancellation of the left turn signal indicator 3 is performed in the same manner.

In the first embodiment, when the turn switch lever 5 is operated to illuminate the turn signal indicators 2 and 3, the turn signal illumination controller 6 calculates the lateral movement distance Y(t) of the vehicle 1 from equations (A) to (C) from when the turn signal indicators 2 and 3 are illuminated. Further, the turn signal illumination controller 6 determines whether or not the lateral movement distance Y(t) is greater than or equal to the threshold value Ka, which is a reference value for determining whether lane changing has been completed. When the lateral movement distance Y(t) becomes greater than or equal to the threshold value Ka, the turn signal illumination controller 6 determines that the vehicle 1 has moved in the lateral direction for an amount corresponding to lane changing and automatically cancels the illuminated turn signal indicators 2 and 3.

In this manner, the automatic cancellation conditions of the turn signal indicators 2 and 3 include the lateral movement distance Y(t) being greater than or equal to the threshold value. Thus, even when the driver hesitates to further proceed with the lane changing or temporarily drives straight near the lane markings and rotates the steering wheel in a direction opposite to the lane changing direction, unintentional cancellation of the turn signal indicators 2 and 3 before the lane changing is completed does not occur. This improves the automatic cancellation function of the turn signal indicators 2 and 3.

The first embodiment has the advantages described below.

(1) When the turn switch lever 5 is operated to illuminate the turn signal indicators 2 and 3, the cancellation execution means determines whether or not the lateral movement distance Y(t) is greater than or equal to the threshold value Ka and automatically cancels the illuminated turn signal indicators 2 and 3. Thus, even when the driver hesitates to further proceed with the lane changing or temporarily drives straight near the lane markings and rotates the steering wheel in a direction opposite to the lane changing direction, unintentional cancellation of the turn signal indicators 2 and 3 before the lane changing is completed does not occur. This improves the automatic cancellation function of the turn signal indicators 2 and 3.

(2) The angular velocity of the vehicle 1 just before changing lanes (initial vehicle bearing angle variation amount ω0) is eliminated from the sensor output of the angular velocity sensor 9. This corrects the vehicle bearing angle variation amount Δθ(t). Thus, the angular velocity produced when the vehicle 1 travels along a curved road is eliminated when changing lanes along the curved road. This allows for accurate calculation of the vehicle bearing angle variation amount Δθ(t) that is in accordance with the actual lane changing. As a result, the cancellation accuracy of the turn signal indicators 2 and 3 is further increased.

(3) The lateral movement distance Y(t) is obtained through relatively simple calculation equations using integration and a trigonometric function. The use of the lateral movement distance Y(t), which applies a low calculation load, increases the cancellation accuracy.

Second Embodiment

A second embodiment will now be discussed with reference to FIGS. 8 to 10. The second embodiment differs from the first embodiment in the cancellation conditions of the turn signal indicators. Otherwise, the second embodiment is the same as the first embodiment. Thus, like or same reference numerals are given to those components that are the same as the corresponding components of the first embodiment. Only the differing parts will be described in detail.

Figure 8:
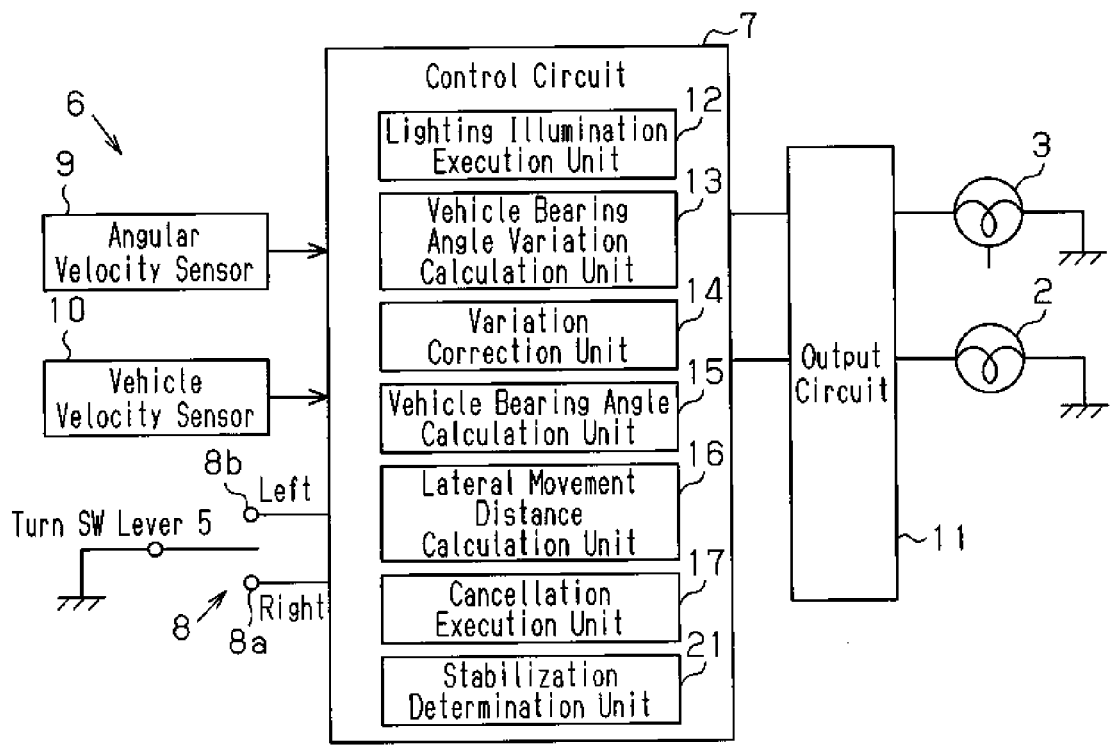
FIG. 8 is a block diagram of a turn signal illumination controller according to a second embodiment.
Figure 9:
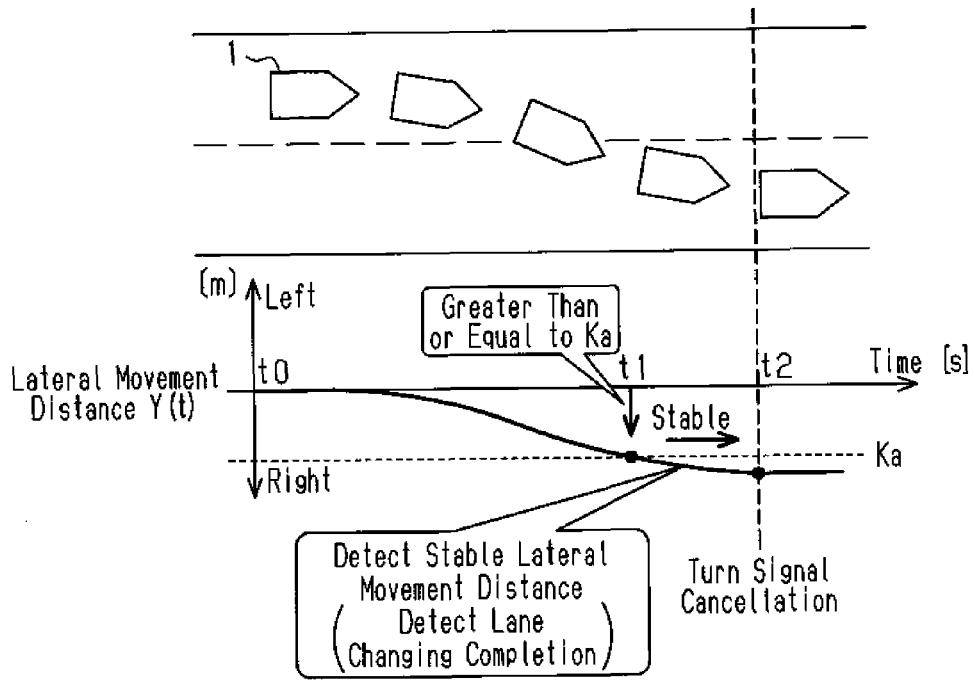
FIG. 9 is a timing chart showing changes in the lateral movement distance when the vehicle changes lanes.

Referring to FIG. 8, the control circuit 7 includes a stabilization determination unit 21, which determines whether or not the lateral movement distance Y(t) of the vehicle 1 has stabilized when changing lanes. When the vehicle 1 is close to completing lane changing, the steering wheel 4, which had been rotated in the lane changing direction, is rotated back in the opposite direction. Thus, referring to FIG. 9, when the vehicle 1 is close to completing lane changing, the lateral movement distance Y(t) is greater than or equal to the threshold value Ka (time t1). Additionally, when the vehicle 1 is steered straight after completing the lane changing, the lateral movement distance Y(t) gradually changes (converges) to a constant value (time t2). The stabilization determination unit 21 serves as a stabilization determination unit and a stabilization detection means.

In this manner, the cancellation conditions of the turn signal indicators 2 and 3 in the second embodiment includes whether change in the lateral movement distance Y(t) has become gradual after the lateral movement distance Y(t) becomes greater than or equal to the threshold value Ka. The stabilization determination unit 21 of the second embodiment, for example, monitors whether the period during which the lateral movement distance Y(t) is greater than or equal to the threshold value Ka has exceeded a stabilization determination reference time and/or monitors whether or not a derivative value of the lateral movement distance Y(t) is less than a predetermined stabilization reference value. When at least either one of these conditions is satisfied, the stabilization determination unit 21 determines that the vehicle 1 has substantially completed changing lanes and has become stable. The stabilization determination reference time and the stabilization determination reference value are each also referred to as a second cancellation determination value.

Figure 10:
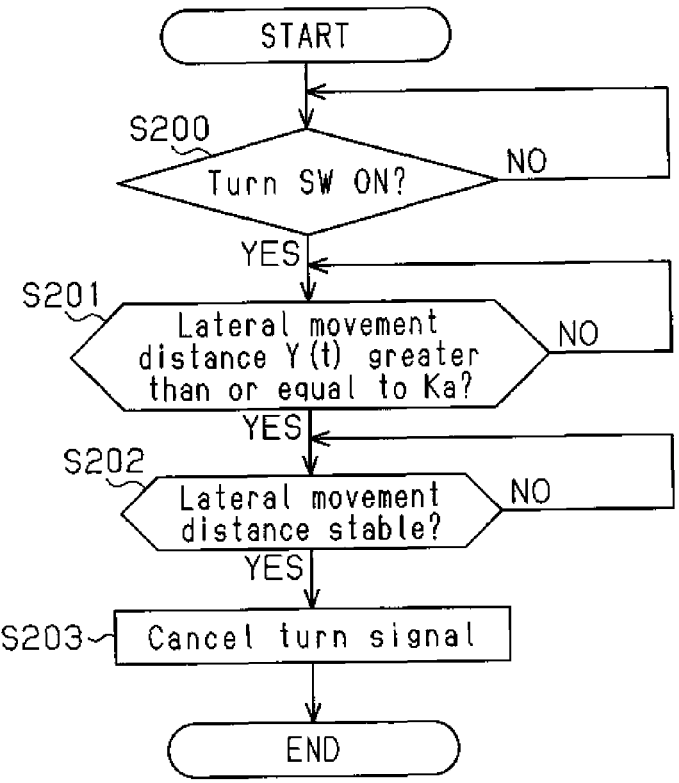
FIG. 10 is a flowchart of a turn signal indicator cancellation control according to the second embodiment.

After the turn switch 8 is switched on to illuminate the turn signal indicators 2 and 3 (step 200 in FIG. 10), when the lateral movement distance Y(t) becomes greater than or equal to the threshold value Ka (step 201 in FIG. 10), the stabilization determination unit 21 checks whether or not the lateral movement distance Y(t) has stabilized (step 202 in FIG. 10). When determining that the lateral movement distance Y(t) has stabilized, the stabilization determination unit 21 notifies the cancellation execution unit 17 of the determination. After the turn switch 8 is switched on, when determining that the lateral movement distance Y(t) is greater than or equal to the threshold value Ka and that the lateral movement distance Y(t) has stabilized (YES in steps 200 to 202 in FIG. 10), the cancellation execution unit 17 determines that the vehicle 1 has completed changing lanes and cancels the turn signal indicators 2 and 3 (step 203 in FIG. 10).

In addition to advantages (1) to (3) of the first embodiment, the second embodiment has the advantage described below.

(4) The cancellation conditions of the turn signal indicators 2 and 3 include whether or not the lateral movement distance Y(t) of the vehicle 1 has become stable. This allows for further accurate determination of whether or not the vehicle 1 has completed changing lanes. Thus, in comparison to when determining cancellation only with the lateral movement distance (Y)t, the automatic cancellation of the turn signal indicators 2 and 3 is performed with further accuracy.

Third Embodiment

Figure 12:
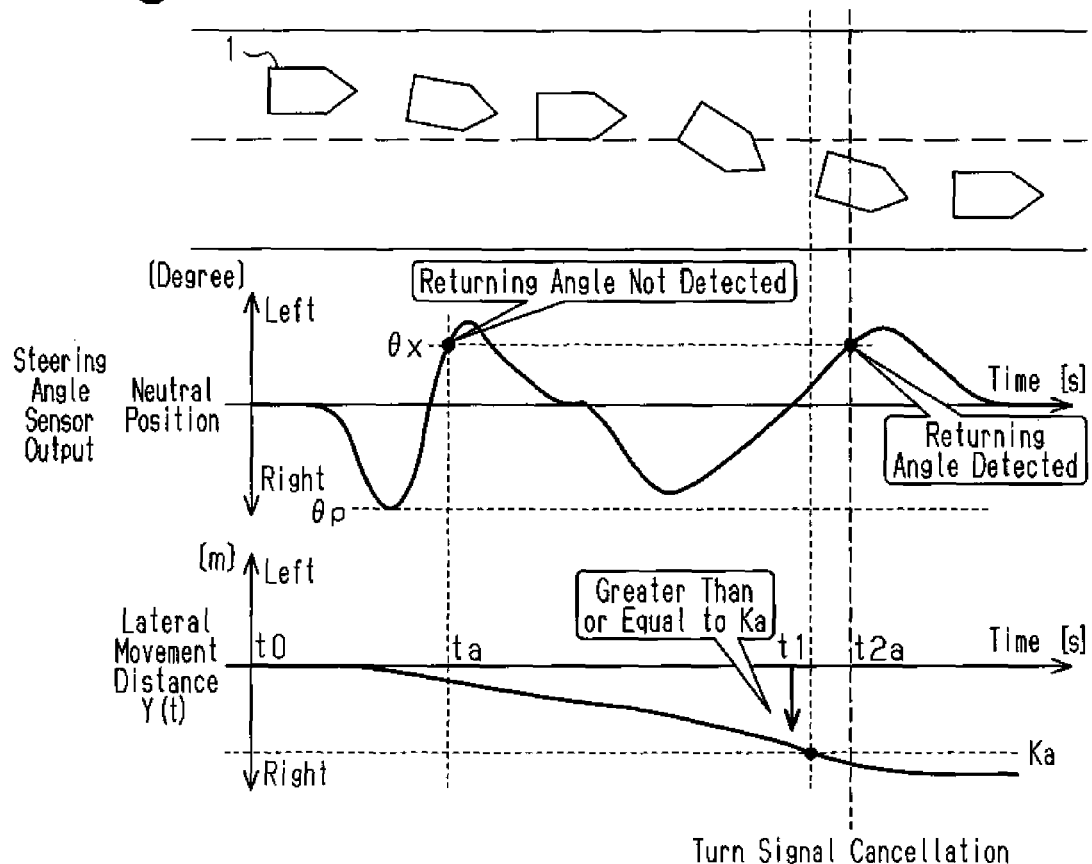
FIG. 12 is a timing chart showing changes in an output signal of a steering angle sensor and the lateral movement distance when the vehicle is changing lanes.
Figure 13:
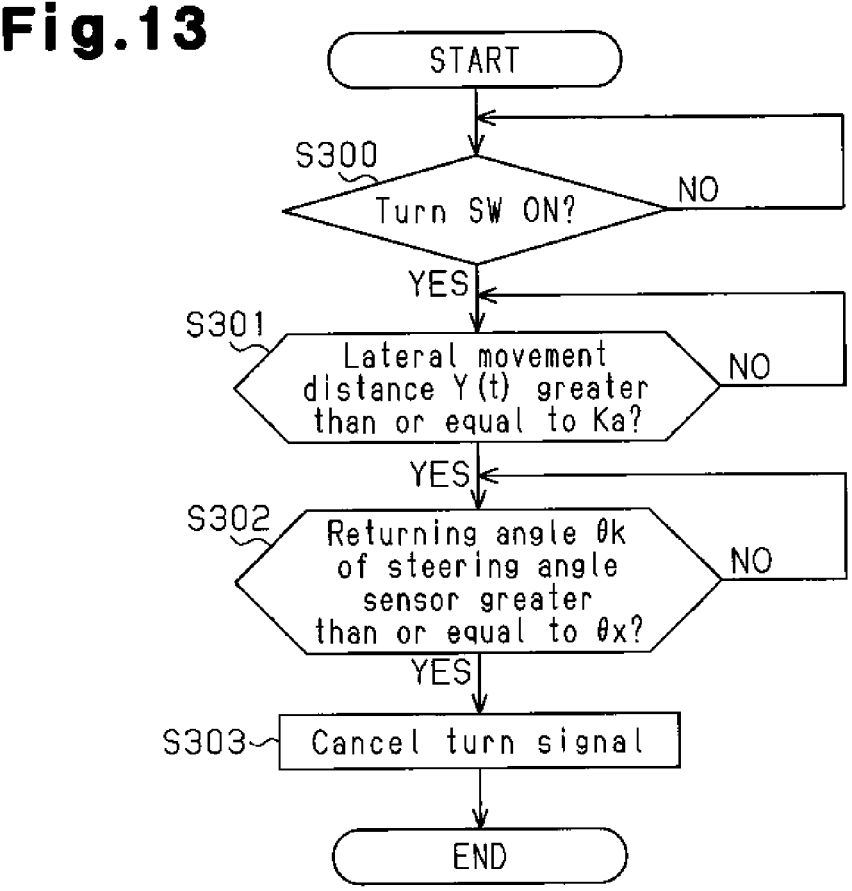
FIG. 13 is a flowchart of a turn signal indicator cancellation control according to the third embodiment.

A third embodiment will now be discussed with reference to FIGS. 11 to 13. The third embodiment differs from the first embodiment in the cancellation conditions of the turn signal indicators. Otherwise, the third embodiment is the same as the first embodiment.

Figure 11:
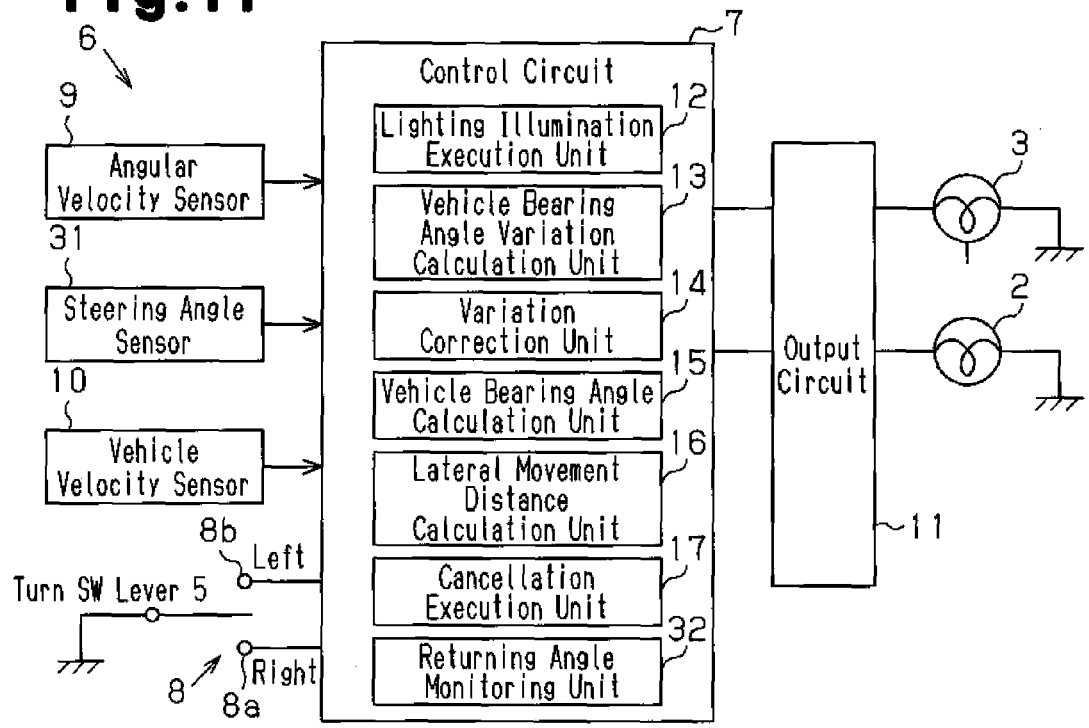
FIG. 11 is a block diagram of a turn signal illumination controller according to a third embodiment.

Referring to FIG. 11, a steering angle sensor 31, which detects the rotational angle (steering amount) of the steering wheel 4, is connected to the control circuit 7. The steering angle sensor 31 sends a rotation detection signal, which is in accordance with the rotational angle of the steering wheel 4, to the control circuit. Further, the control circuit 7 includes a returning angle monitoring unit 32. The returning angle monitoring unit 32 sets a recovery determination reference angle θx in accordance with the vehicle velocity signal from the vehicle velocity sensor 10. After the lateral movement distance Y(t) becomes greater than or equal to the threshold value Ka, the returning angle monitoring unit 32 monitors whether or not a returning angle θk of the steering wheel 4 has becomes greater than or equal to the recovery determination reference angle θx. Based on the rotation detection signal from the steering angle sensor 31, the returning angle monitoring unit 32 monitors the returning angle θk of the steering wheel 4. The steering angle sensor 31 serves as a rotational amount detection unit and rotational amount detection means, the returning angle monitoring unit 32 serves as a returning angle monitoring unit and a returning angle monitoring means, and the recovery determination reference angle θx serves as a recovery determination reference value. The recovery determination reference angle θx is also referred to as a third cancellation determination reference value.

The recovery determination reference angle θx is a variable value set in accordance with the vehicle velocity of the vehicle 1. The returning angle θk is the rotational amount (rotational angle) of the steering wheel 4 from the rotational position at which the turn signal indicator 2 (3) has been illuminated. In one example, the returning angle θk and the recovery determination reference angle θx are angles set relative to the rotational position of the steering wheel 4 at which the turn signal indicator 2 (3) is illuminated. The recovery determination reference value θx, for example, is set to be smaller when the vehicle velocity is low and set to be larger when the vehicle velocity is high. The recovery determination reference angle θx may be periodically or continuously re-set or changed in accordance with the vehicle velocity when the vehicle 1 is changing lanes after the turn signal indicator 2 (3) is illuminated.

When the vehicle 1 is close to completing lane changing, the steering wheel 4, which has been rotated in the lane changing direction, is rotated back in the opposite direction to steer the vehicle 1 straight ahead. In this state, the back rotation angle (returning angle θk) of the steering wheel 4 becomes greater than or equal to the recovery determination reference angle θx (time t2*a*). This change in the rotational angle of the steering wheel 4 is added to the cancellation conditions of the turn signal indicators 2 and 3.

In the third embodiment, after the turn switch 8 is switched on, the returning angle monitoring unit 32 detects a peak value θp in the rotational angle of the lane changing direction from the rotation detection signal of the steering angle sensor 31. Then, the returning angle monitoring unit 32 monitors the returning angle θk of the steering wheel 4 from when the peak value θp is detected. The peak value θp corresponds to a minimum value of the rotation detection signal. The detection of the peak value θp is performed by, for example, detecting the point at which the rotation detection signal switches from a decreasing (decrementing) state to an increasing (incrementing) state or from an increasing (incrementing) state to a decreasing (decrement) state. After the lateral movement distance Y(t) becomes greater than or equal to the threshold value Ka, the returning angle monitoring unit 32 starts checking whether or not the returning angle θk has become greater than or equal to the recovery determination reference angle θx.

After the lateral movement distance Y(t) becomes greater than or equal to the threshold value Ka (step 301), when the returning angle monitoring unit 32 determines that the returning angle θk has become greater than or equal to the recovery determination reference angle θx (step 302), the returning angle monitoring unit 32 notifies the cancellation execution unit 17 of the determination. After the turn switch 8 is switched on, when determining that the lateral movement distance Y(t) is greater than or equal to the threshold value Ka and that the returning angle θk has become greater than or equal to the recovery determination reference angle θx (YES in steps 300 to 302 in FIG. 13), the cancellation execution unit 17 determines that the vehicle 1 has completed changing lanes and cancels the turn signal indicators 2 and 3 (step 303).

In addition to advantages (1) to (3) of the first embodiment, the third embodiment has the advantage described below.

(5) The cancellation conditions of the turn signal indicators 2 and 3 include whether or not the returning angle θk of the steering wheel 4 has become greater than or equal to the recovery determination reference angle θx. This allows for further accurate determination of whether or not the vehicle 1 has completed changing lanes. Thus, in comparison to when determining cancellation only with the lateral movement distance (Y)t, the automatic cancellation of the turn signal indicators 2 and 3 is performed with further accuracy.

Fourth Embodiment

A fourth embodiment will now be discussed with reference to FIGS. 14 to 16. The fourth embodiment differs from the third embodiment in the cancellation conditions of the turn signal indicators. Otherwise, the fourth embodiment is the same as the third embodiment.

Figure 14:
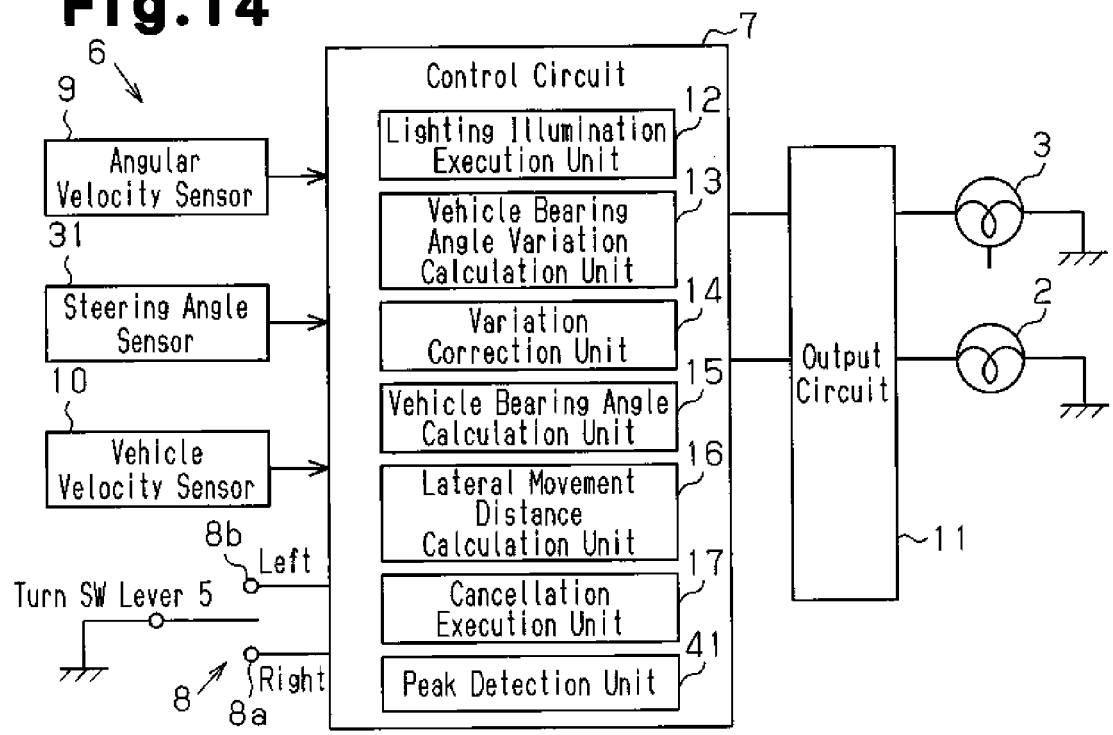
FIG. 14 is a block diagram of a turn signal illumination controller according to a fourth embodiment.

Referring to FIG. 14, the control circuit 7 includes a peak detection unit 41. After the lateral movement distance Y(t) becomes greater than or equal to the threshold value Ka, the peak detection unit 41 detects a peak in the rotation detection signal of the steering angle sensor 31 that corresponds to rotation in the direction opposite to the direction the steering wheel 4 was rotated when the vehicle 1 started changing lanes (opposite direction peak). When the vehicle 1 is close to completing lane changing, the steering wheel 4 is rotated back in the direction opposite to the lane changing direction. Thus, referring to FIG. 15, the rotation detection signal of the steering angle sensor 31 includes a peak for the rotation of the steering wheel in a direction opposite to the direction the steering wheel 4 was rotated when the vehicle 1 started changing lanes (time t2*b*). In the fourth embodiment, the cancellation conditions of the turn signal indicators 2 and 3 include the rotation detection signal of the steering angle sensor 31 having an opposite direction peak.

Figure 15:
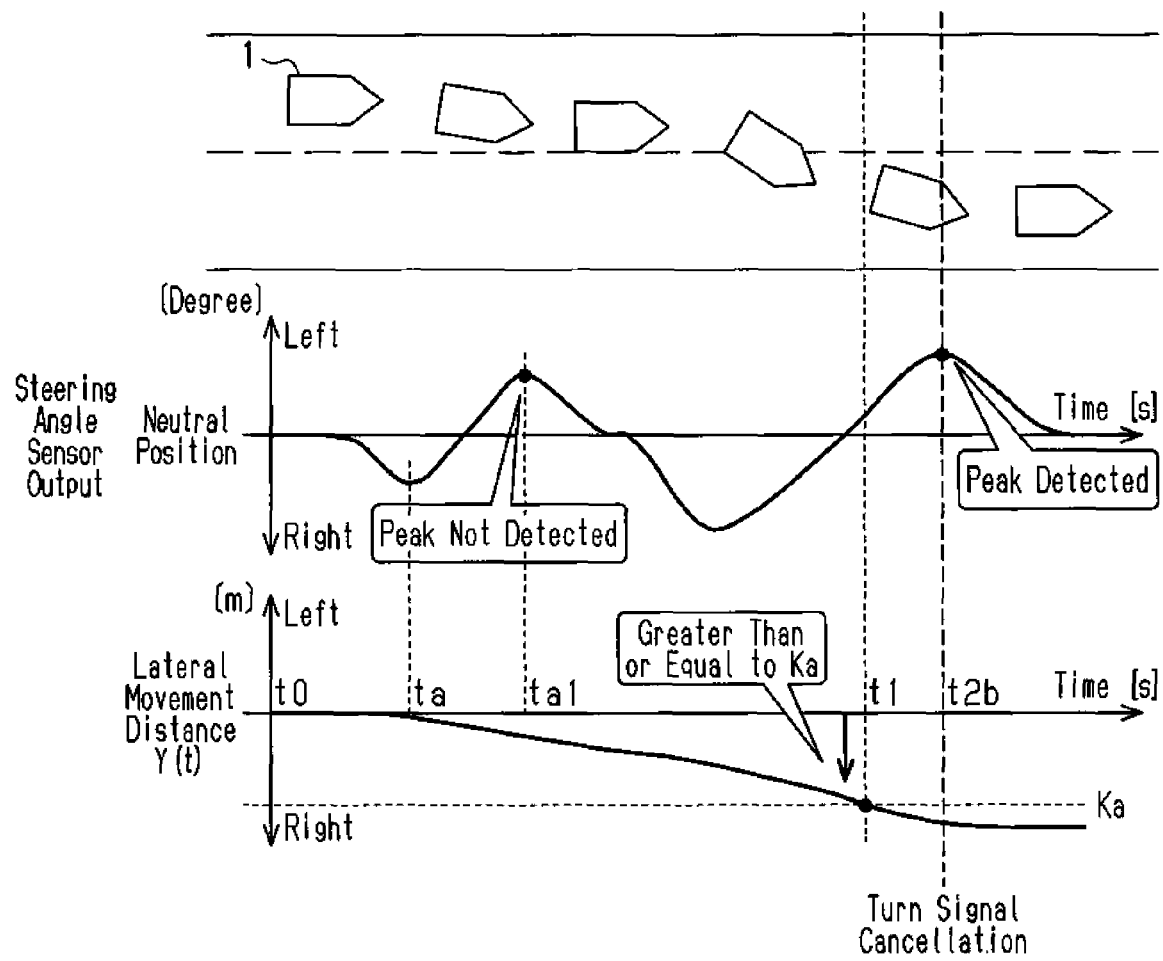
FIG. 15 is a timing chart showing changes in the output signal of the steering angle sensor and the lateral movement distance when the vehicle is changing lanes.
Figure 16:
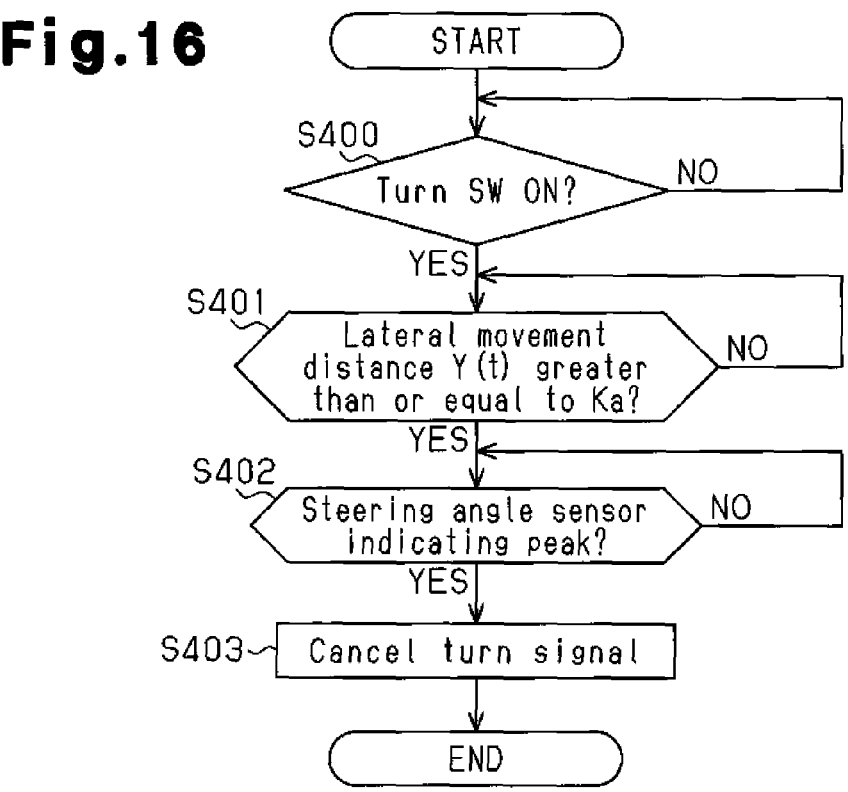
FIG. 16 is a flowchart of a turn signal indicator cancellation control according to the fourth embodiment.
Figure 17:
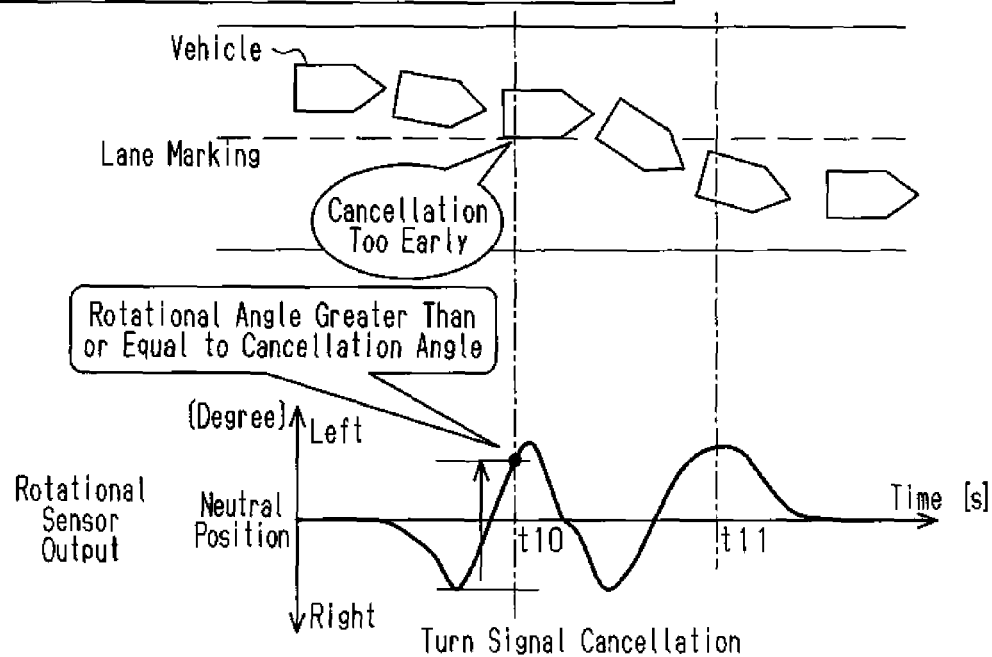
FIG. 17 is a timing chart showing a cancellation operation of a turn signal indicator in the prior art.

In the fourth embodiment, after the turn switch 8 is switched on, the peak detection unit 41 recognizes the first peak in the rotation detection signal of the steering angle sensor 31 as a peak produced when the vehicle 1 starts to change lanes (time to in FIG. 15). The peak detection is performed, for example, when the rotation detection signal switches from a decrementing state to an incrementing state or from an incrementing state to a decrement state. After the lateral movement distance Y(t) becomes greater than or equal to the threshold value Ka (time t1 in FIG. 15), the peak detection unit 41 initiates the detection of the opposite direction peak, which is produced in the rotation of the steering wheel 4 in the direction opposite to the direction in which the vehicle 1 changed lanes. When detecting the opposite direction peak, which is a returning point of the rotation detection signal (t2*b* in FIG. 15), the peak detection unit 41 notifies the cancellation execution unit 17 of the detection. Thus, the occurrence of the opposite direction peak is not detected when the lateral movement distance Y(t) is less than the threshold value Ka (time ta1). The peak detection unit 41 serves as a peak detection means.

After the turn switch 8 is switched on (step 400 in FIG. 16), when the lateral movement distance Y(t) is greater than or equal to the threshold value Ka (step 401) and the opposite direction peak is recognized (step 402) from the notification of the peak detection unit 41, the cancellation execution unit 17 determines that the vehicle 1 has completed changing lanes and cancels the turn signal indicators 2 and 3 (step 403).

In addition to advantages (1) to (3) of the first embodiment, the fourth embodiment has the advantage described below.

(6) The cancellation conditions of the turn signal indicators 2 and 3 include the rotation detection signal of the steering angle sensor 31 having a peak in a direction opposite to the direction in which the vehicle 1 changed lanes when the turn switch 8 was switched on. This allows for further accurate determination of whether or not the vehicle 1 has completed changing lanes. Thus, in comparison to when determining cancellation only with the lateral movement distance (Y)t, the automatic cancellation of the turn signal indicators 2 and 3 is performed with further accuracy.

It should be apparent to those skilled in the art that the present invention may be embodied in many other specific forms without departing from the spirit or scope of the invention. Particularly, it should be understood that the present invention may be embodied in the following forms.

In the first to fourth embodiments, the angular velocity detection means is not limited to a yaw rate sensor. For example, the angular velocity detection means may be a device that multiples the sensor output of the steering angle sensor 31 corresponding to the rotational angle of the steering wheel 4 by the vehicle velocity $V(t)$ to calculate the angular velocity $\omega(t)$. Further, a sensor other than a yaw rate sensor may be used as the angular velocity detection means as long as the angular velocity is detectable.

In the first to fourth embodiments, the vehicle velocity $V(t)$ does not have to be obtained with the vehicle velocity sensor 10, which detects the rotation amount of an output shaft of the vehicle. For example, the vehicle velocity $V(t)$ may be obtained from the meter panel.

In the first to fourth embodiments, the threshold value Ka is not limited to a fixed value and may be a variable value that varies in accordance with circumstances such as the vehicle velocity $V(t)$. For example, by varying the threshold value Ka in accordance with the vehicle velocity $V(t)$, the automatic cancellation of the turn signal indicators 2 and 3 is performed with further accuracy. In the same manner, the recovery determination reference angle $\theta x$, which is a comparison value of the returning angle $\theta k$, may be varied in accordance with the circumstances.

In the first to fourth embodiments, the steering angle sensor 31 may be of various types, such as an optical type or a magnetic type.

In the first to fourth embodiments, the correction function of the vehicle bearing angle variation amount $\Delta\theta(t)$, or the variation correction unit 14, may be eliminated.

In the first to fourth embodiments, the calculation of the lateral movement distance $Y(t)$ is not limited to the example of the foregoing description and various types of equations or rules may be used for the calculation.

In the first to fourth embodiments, the turn switch lever 5 is not limited to a momentary type. For example, a device that holds the turn switch lever 5 at a tilted position and releases and returns the turn switch lever 5 to its original neutral position when the cancellation conditions of the turn signal indicators 2 and 3 are satisfied may be used.

In the first to fourth embodiments, the turn switch lever 5 is not limited to a lever type and may be, for example, a paddle type or a switch type.

In the first to fourth embodiments, a light emitting element such as a lamp or a light emitting diode (LED) may be used as the turn signal indicators 2 and 3.

In the first to fourth embodiments, the initial vehicle bearing variation amount $\omega 0$ detected just before the vehicle 1 changes lanes does not have to be continuously used in subsequent calculations that are executed until the turn signal indicators 2 and 3 are cancelled. For example, when the vehicle 1 includes an on-board device that detects the road conditions such as the curvature of the road, the on-board device may calculate the initial vehicle bearing variation amount $\omega 0$ whenever the vehicle bearing variation amount $\Delta\theta(t)$ is calculated. This allows for the vehicle bearing variation amount $\Delta\theta(t)$ to be calculated further accurately.

In the first to fourth embodiments, the threshold value Ka may be a fixed value that is stored beforehand in the control circuit 7. When the vehicle 1 includes an on-board device that detects the road conditions such as the lane width, the threshold value Ka may be a variable value set in accordance with the road conditions detected by the on-board device.

In the first to fourth embodiment, the automatic cancellation of the turn signal indicators 2 and 3 functions only when changing lanes. However, the automatic cancellation is applicable to, for example, when cancelling a signal used to indicate that the vehicle 1 is turning right or left.

In the fourth embodiment, the peak does not have to be obtained by detecting the point at which the sensor output of the steering angle sensor 31 switches between positive and negative. For example, a derivative value of the sensor output of the steering angle sensor 31 may be monitored instead.

In the first to fourth embodiment, an operation member, such as a button or a switch, used exclusively for turn signal indicator cancellation may be arranged in the vehicle to allow for manual cancellation of the illuminated turn signal indicators 2 and 3.

In the first to fourth embodiments, the vehicle 1 is not limited to an automobile. For example, the present invention may also be applied to other vehicles, such as a two-wheel vehicle.

The vehicle bearing angle variation calculation unit 13, the variation correction unit 14, the vehicle bearing angle calculation unit 15, the lateral movement distance calculation unit 16, the cancellation execution unit 17, the stabilization determination unit 21, the returning angle monitoring unit 32, and the peak detection unit 41 may be discrete circuits arranged in the control circuit. Alternatively, a CPU of the control circuit 7 may realize the functions of each of these circuits in accordance with program code stored in the control circuit 7.

The present examples and embodiments are to be considered as illustrative and not restrictive, and the invention is not to be limited to the details given herein, but may be modified within the scope and equivalence of the appended claims.

What is claimed is:

1. A turn signal illumination controller for controlling illumination of a turn signal indicator when a turn signal operation member of a vehicle is operated, the turn signal illumination controller comprising:
   an angular velocity detection unit that detects an angular velocity of the vehicle when the vehicle changes its travel direction;
   a vehicle bearing angle variation calculation unit that calculates a vehicle bearing angle variation amount per unit time when the travel direction is changing based on a detection value of the angular velocity detection unit;
   a vehicle bearing angle calculation unit that calculates a vehicle bearing angle when the travel direction is changing based on the vehicle bearing angle variation amount obtained by the vehicle bearing angle variation calculation unit;
   a lateral movement distance calculation unit that calculates a lateral movement distance of the vehicle when the travel direction is changing based on the vehicle bearing angle obtained by the vehicle bearing angle calculation unit; and
   a cancellation execution unit that cancels the illuminated turn signal indicator when the calculated lateral movement distance is greater than or equal to a threshold value.

2. The turn signal illumination controller according to claim 1, further comprising:
  a stabilization determination unit that determines whether the calculated lateral movement distance is stable;
  wherein when the cancellation execution unit determines that a condition in which the calculated lateral movement distance is greater than or equal to the threshold value and a condition in which the calculated lateral movement distance is stable are at least both satisfied, the cancellation execution unit cancels the illuminated turn signal indicator.

3. The turn signal illumination controller according to claim 1, further comprising:
  a rotational amount detection unit that detects a rotational angle of a steering wheel of the vehicle; and
  a returning angle monitoring unit that monitors a returning angle of the steering wheel in a direction opposite to a rotation direction of the steering wheel when the turn signal operating member is operated to illuminate the turn signal indicator based on the rotational angle of the steering wheel detected by the rotational amount detection unit and determines whether or not the returning angle is greater than or equal to a recovery determination reference value;
  wherein when the cancellation execution unit determines that a condition in which the calculated lateral movement distance is greater than or equal to the threshold value and a condition in which the returning angle is greater than or equal to the recovery determination reference value are at least both satisfied, the cancellation execution unit cancels the illuminated turn signal indicator.

4. The turn signal illumination controller according to claim 3, wherein the returning angle monitoring unit determines whether the returning angle is greater than or equal to the recovery determination reference value after the calculated lateral movement distance becomes greater than or equal to the threshold value.

5. The turn signal illumination controller according to claim 3, wherein the returning angle monitoring unit sets the recovery determination reference value in accordance with a vehicle velocity.

6. The turn signal illumination controller according to claim 1, further comprising:
  a rotational amount detection unit that detects a rotational angle of a steering wheel of the vehicle; and
  a peak detection unit that monitors the rotational angle of the steering wheel detected by the rotational amount detection unit and detects a peak in the rotational angle of the steering wheel that is rotated in a direction opposite to the direction the steering wheel was rotated when the turn signal operating member illuminated the turn signal indicator;
  wherein when the cancellation execution unit determines that a condition in which the calculated lateral movement distance is greater than or equal to the threshold value and a condition in which the peak is detected are at least both satisfied, the cancellation execution unit cancels the illuminated turn signal indicator.

7. The turn signal illumination controller according to claim 6, wherein the peak detection unit starts detection of the peak after the calculated lateral movement distance becomes greater than or equal to the threshold value.

8. The turn signal illumination controller according to claim 1, further comprising:
  an output correction unit that corrects a detection value of the angular velocity detection unit by subtracting from the detection value of the angular velocity detection unit an initial angular velocity of the vehicle detected when the turning signal operating member is operated to illuminate the turn signal indicator, wherein the initial angular velocity is produced by rotation of the steering wheel before the turn signal indicator is illuminated.

9. A method for controlling illumination and cancellation of a turn signal indicator for a vehicle, the method comprising:
  detecting an angular velocity of the vehicle when the vehicle changes its travel direction;
  calculating a vehicle bearing angle variation amount per unit time when the travel direction is changing based on the detected angular velocity;
  calculating a vehicle bearing angle when the travel direction is changing based on the vehicle bearing angle variation amount;
  calculating a lateral movement distance of the vehicle when the traveling direction is changing based on the vehicle bearing angle; and
  cancelling the illuminated turn signal indicator when the calculated lateral movement distance is greater than or equal to a threshold value.

* * * * *